G. N. AND A. M. SIMPSON.
CAR DUMP.
APPLICATION FILED SEPT. 5, 1919.
1,412,030.
Patented Apr. 4, 1922.
2 SHEETS—SHEET 1.
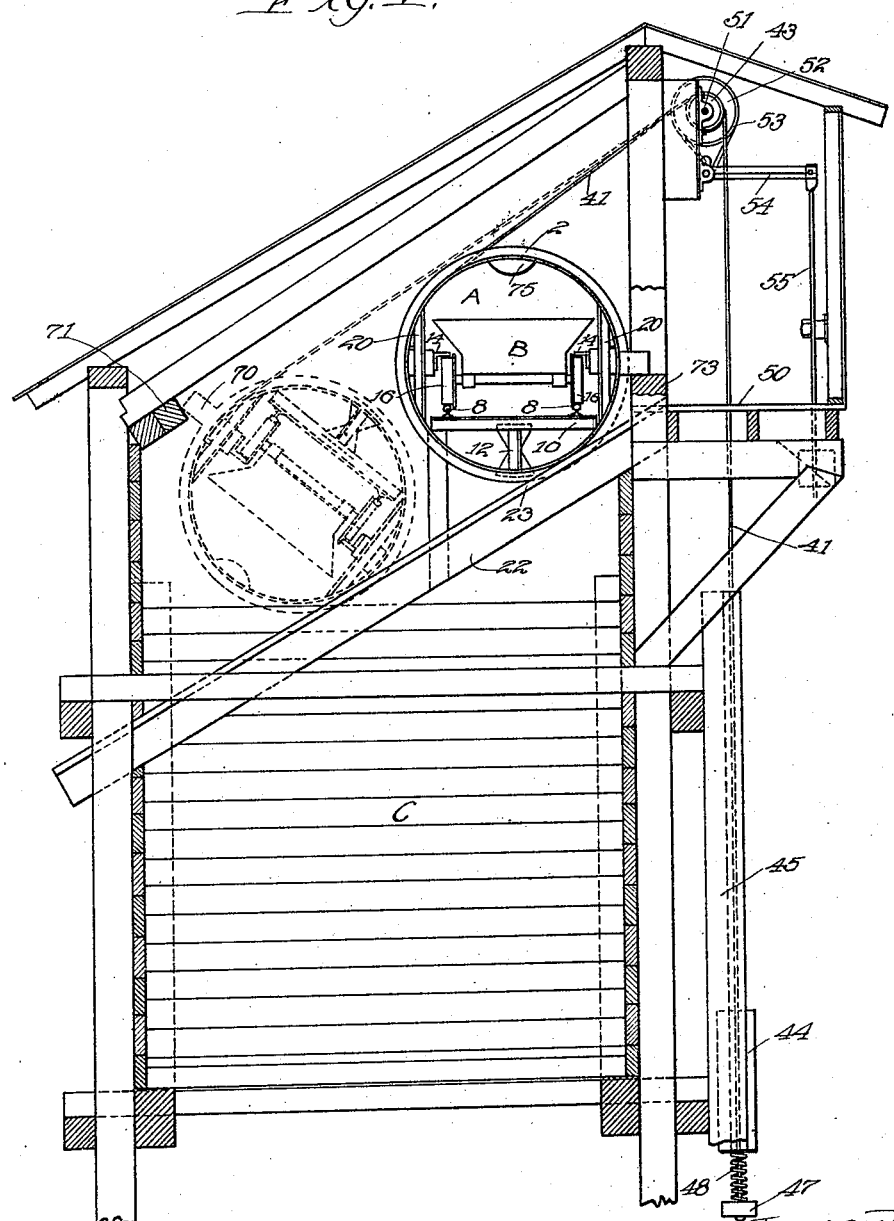

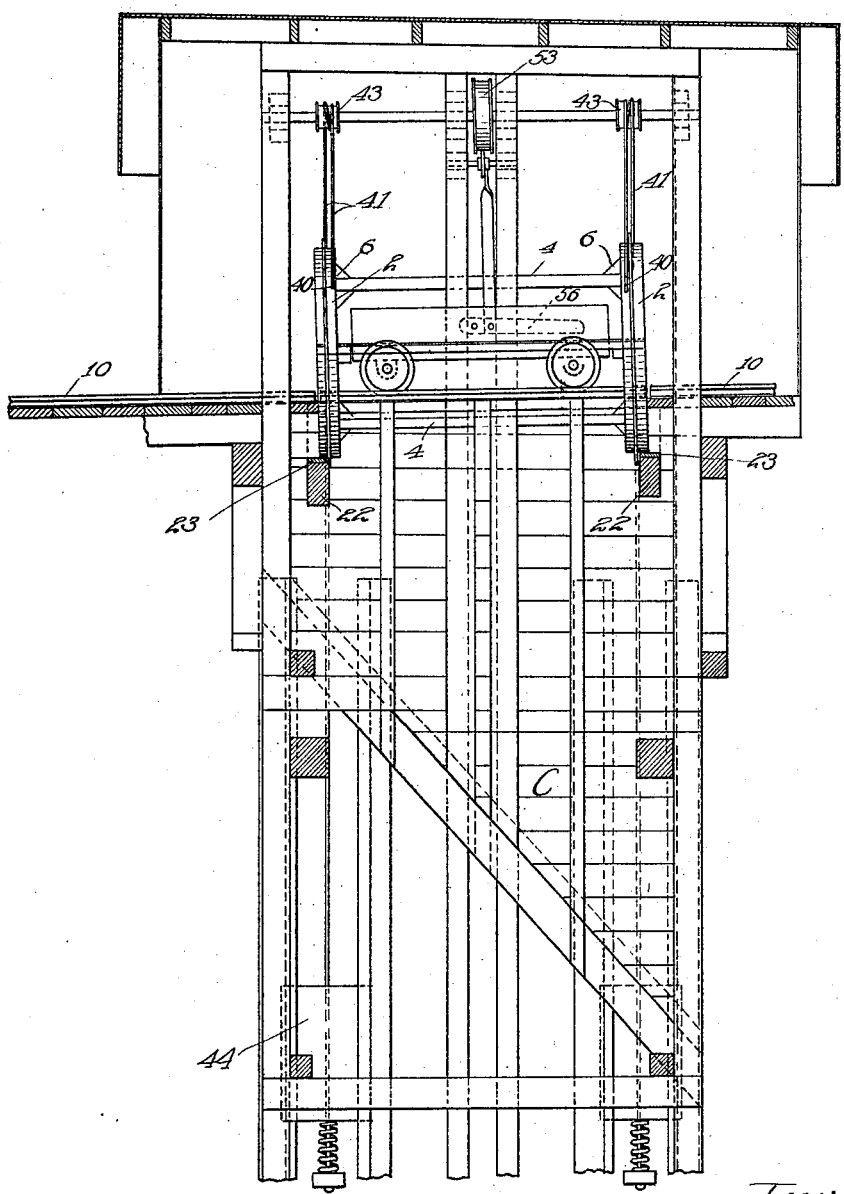

UNITED STATES PATENT OFFICE.

GEORGE N. SIMPSON AND ARTHUR M. SIMPSON, OF CHICAGO, ILLINOIS.

CAR DUMP.

1,412,030.          Specification of Letters Patent.        Patented Apr. 4, 1922.

Application filed September 5, 1919. Serial No. 321,971.

*To all whom it may concern:*

Be it known that we, GEORGE N. SIMPSON and ARTHUR M. SIMPSON, citizens of the United States, residing at Chicago, in the county of Cook and State of Illinois, have invented new and useful Improvements in Car Dumps, of which the following is a specification.

This invention relates to an improved apparatus for dumping cars and as shown in this specification is especially adapted for use in dumping one or more mine cars. As we have shown the device here it is adapted for dumping one car at a time. Our improved device is in the nature of a rotary dump. That is, the loaded car is dumped by rotating it. It also falls in the general class of dumps known as gravity dumps, since the force of gravity is utilized for causing the necessary rotation of the loaded car.

Heretofore there have been in use many kinds of rotating gravity dumps. The general construction heretofore used consists of a cylindrical cage pivoted on a longitudinal axis. The apparatus is so designed, that when the loaded car is in the cage ready to be dumped, the center of gravity is above the axis of rotation. This location of the center of gravity causes a rotation of the cage when the fastening devices are released, and a consequent spilling of the load from the car. In devices of this kind counterweights are used for restoring the cage to its upright position after the car is empty. Devices of this kind are objectionable for the following reasons. If the center of gravity of the device, with a loaded car in the cage, is not some distance above the axis of rotation, sufficient rotation of the cage is not procured to produce a complete emptying of the car, and power or some other means must be resorted to to continue the rotation to a sufficient extent to cause a complete evacuation. In this connection it must be borne in mind that an apparatus of this kind being designed for rough and heavy usage necessarily has considerable friction in its operation. If, on the other hand, the apparatus is so designed that the center of gravity is considerably above the axis of rotation when a loaded car is in the cage, the rotation will be sufficient through the force of gravity alone, to completely empty the car, but when this process is completed, the center of gravity will necessarily be considerably below the axis of rotation, making it difficult to again restore the cage to its upright position. As has been stated, counterweights are used to restore the cage with its empty car to an upright position, but this is not a simple matter, since the weight required to restore the cage to such position is not constant. In the case just mentioned, where the center of gravity of the apparatus is considerably below the axis of rotation after the car has been emptied, a heavy counterweight is required to commence the rotation of the cage back toward its upright position. As the cage approaches its upright position, however, with the center of gravity again approaching a point above the axis of rotation, the weight of the counterweight required to continue such rotation is considerably less. It is obvious, therefore, that unless means are devised for checking the backward rotation of the cage or for decreasing the weight of the counterweight, the cage will reach its upright position with great velocity and momentum making the stopping of it a difficult problem. It will be noted, therefore, that in general, the objection to those dumps which operate by rotation on a stationary axis lies in the fact that during the operation of the device the relative position between the center of gravity of the device and the axis of rotation varies. For this reason, therefore, it is impossible to return the cage to its upright position by use of a constant force.

We have designed a rotating dump operated through the force of gravity which is not subject to the objections noted above. In our improved dump, we do not use a stationary axis upon which to turn the cage which holds the car but use a cylindrical cage which is designed to roll down an incline thus causing sufficient rotation to empty the car contained therein. In such a device, it will be noted that the axis of rotation is at the line of contact between the cylindrical cage and inclined surface and that as the device operates this axis of rotation shifts. Our device is so designed that the cage with an empty car has its center of mass lying substantially on a line which is the axis of the cylindrical cage. It is obvious, therefore, that with such a construction the relative positions of the center of gravity of the cage with an empty car and the axis of rotation remain the same throughout the entire movement of the cage from the position it occupies just after the car has been emptied until it is returned to its normal upright position. To effect this movement, therefore, a constant force is required and a counterweight of constant weight can be readily utilized.

A device embodying the features of our invention is shown in the accompanying drawings in which: Fig. 1 is a transverse vertical sectional view of a dump adapted for use with mine cars. Fig. 2 is a longitudinal sectional view of the same device.

As shown in said drawings, A indicates a cylindrical cage formed of the two rings 2, 2 joined by the bars 4, 4. Requisite plates for bracing the corners are indicated by 6, 6. Within the cage A are mounted two rails 8, 8 which form a continuation of the rails 101, 101 leading on an incline from the mine. The rail sections 8, 8 are supported within the cage A by the cross-bars 101, 101 which are supported at their ends on the rings 2, 2 and additionally supported at the center as indicated by the braces 12, 12. Within the cage A are arranged the angle irons 14, 14 adapted to lie above the wheels 16, 16 of a mine car B when the same is in the cage to hold it on the rails as the cage A rotates. The angle irons 14, 14 are suitably fastened in any manner in the cage, and as here shown they are supported by the uprights 20, 20 the ends of which are fastened to the rings 2, 2 in any convenient manner.

Each of the rings 2, 2 of the cage A is formed of two angle irons with two of their surfaces fastened together so that they will form a ring with a cylindrical surface having a radially projecting flange at the center. The two rings 2, 2 are adapted to rest on the two inclined timbers 22, 22 on the upper surface of each of which is mounted a flat steel rail 23. The radial flanges on the rings 2, 2 lie inside the inner edges of the rails 23, 23, so that the cage in rolling on the rails is prevented from moving to either side.

Below the timbers 22, 22 is a bin C adapted to receive the contents of a car B after it has been dumped.

The apparatus is so designed that a loaded mine car B may be placed in the cage A, and the cage then allowed to roll down the inclined timbers 22, 22 until it is in the position shown by the dotted lines in Fig. 1. During this movement the car B is overturned spilling the contents into the bin C. It will be noted that dumping the car B in this manner will spread its contents over more surface in the bin C than if the cage A rotated on a stationary axis. This is another of the features of our invention since in many cases it is advantageous to so spread the contents of the car.

We have provided the following means for controlling the operation of the cage A. Fastened to each ring 2 at 40 inside of the radial flange is a cable 41 leading from the ring over a pulley 43 mounted above and to one side of the cage, and thence leading downwardly with its end attached to a counterweight 44 adapted to slide in the guides 45. A spring connection is provided between the cable 41 and the counterweight 44, the cable 41 extending through a hole in the counterweight to a point below it and there being fastened to a block 47 which has mounted above it and under the counterweight the spiral spring 48. The cable 41 extends from the pulley 43 through a hole provided in the operating platform 50. The pulleys 43, 43 are mounted on a shaft 51 suitably journaled which has also mounted on it the brake drum 52. Operating on the brake drum 52 is a brake band 53 controlled by the lever 54 which is adapted to be operated by the vertical rod 55 controlled by the operating handle 56 conveniently located with regard to the operating platform 50.

In the operation of our improved device, a loaded mine car B is placed in the cage A as shown by the solid lines in Fig. 1. The weight of the counterweight 44 is sufficient to roll the combined weight of the cage A and an empty car B up the incline but is not sufficient to so lift the combined weight of the cage A and a loaded car B. Rotation of the cage A with a loaded car B is prevented by the band brake 53 on the brake drum 52. When it is desired to permit the cage A to dump, the band brake is released. The weight of the cage A and the loaded car B then causes the cage to roll down the inclined rails until it is in the position indicated by the dotted lines in Fig. 1. It is obvious that this movement will rotate the car B sufficiently to dump its contents in the bin C. This movement of the cage A can be regulated or checked as desired by the use of the brake band 53 on the brake drum 52. As this movement takes place the cables 41, 41 will wind up on the rings 2, 2 and the counterweights 44, 44 will be raised. After the car B is dumped the counterweights 44, 44 will tend to restore the cage A to its normal position since they are sufficient to roll the cage and an empty car up the incline. The counterweights, therefore, will cause the cage A to roll back up the inclined rails until it assumes its upright position as indicated by the solid lines in Fig. 1. This movement likewise can be controlled as desired by the use of the band brake, 53.

The apparatus is so designed that the center of mass of the cage A with an empty car B placed in it lies substantially in the axis of the cylindrical cage, that is, on a line joining the center points of the two rings 2, 2. This may be accomplished by a suitable arrangement of the parts and by suitably adjusting the weights of the different parts, or counterweights attached to the rings 2, 2 as indicated by 75, 75 may be made use of. It is obvious that with this construction, as the cage with its empty car is returned to its upright position after the dumping operation, the relative positions of the center of gravity and the axis of rotation of the cage will remain the same. The center of gravity of the apparatus, as has been stated, will lie in the axis of the cylindrical cage, and the axis of rotation will be the line of contact between the rings 2, 2 and the inclined rails 23, 23. It is obvious that the relation between these two lines will be the same in all positions of the cage A. With such a construction, therefore, counterweights 44, 44 just heavy enough to commence the return movement of the cage are required and since the center of gravity does not change with respect to the axis of rotation, such weights are sufficient to continue this rotation until the upright position has been reached.

It will be noted also that in our improved device any load in the car B is considerably above the axis of rotation of the cage A, since this axis of rotation is identical with the line of contact between the rings 2, 2 and the inclined rails 23, 23. For this reason a slight load in the car B will be sufficient to cause the downward rolling on the rails. It is obvious, that for the same reason, as long as any load remains in the car B the downward rolling will continue. In other words, the dumping movement will always continue until the car has been completely emptied. This is due to the fact that any load in the car B is always considerably above the axis of rotation. This is one of the features of our invention and is a distinct improvement on the devices heretofore used.

Summing up it might be stated that the broad features of our invention are the provision of a rotating dump in which the axis of rotation shifts, so that the load in the car to be dumped is always considerably above this axis during the entire dumping operation, and in which the center of mass of the cage with an empty car (the center of gravity) always has a position having the same relation to the axis of rotation through the entire movement of the cage from the position it occupies after it has been dumped until it is restored to its normal upright position.

Projecting from the rings 2, 2 we have provided the stops 70, 70 adapted to engage with the timber 71 to limit the downward movement of the cage A, and the timber 73 to limit its upward movement.

Although we have shown the supporting surface for the cage to be rather steeply inclined, it is obvious that, without detracting from the spirit of this invention, such surface may be made with any degree of inclination or may even be level. In this connection it is to be noted that if the supporting surface is level, and the center of gravity is exactly above the line of contact between the cage and such supporting surface when a loaded car is in the cage, in its normal upright position, some means other than gravity must be resorted to to commence rotation of the cage until the center of gravity shifts to a position to one side of a point directly above such line of contact so that gravity alone will continue the rolling and dumping movement.

We claim:

1. In a car dumper, a substantially cylindrical cage adapted to contain a car to be dumped, the center of mass of the cage with an empty car therein lying substantially in the axis of said cylindrical cage, said cage being supported on a slanting surface and adapted to roll downward on said slanting surface to dump a car contained within the cage, and a counter-weight attached to said cage.

2. In a car dump, a substantially cylindrical cage adapted to contain a car to be dumped, said cage being supported on a slanting surface and adapted to roll downward on said slanting surface to dump the car, the center of mass of the cage with an empty car therein lying substantially in the axis of said cylindrical cage.

3. In a car dump, a substantially cylindrical cage adapted to contain a car to be dumped, said cage being supported on a slanting surface and adapted to roll downward on said slanting surface to dump the car, the center of gravity of the cage with a loaded car therein lying above the line of contact between said cage and the supporting surface.

4. In a car dump, a substantially cylindrical cage adapted to contain a car to be dumped, said cage being supported on a slanting surface and adapted to roll downward on said slanting surface to dump the car, the center of gravity of the cage with a loaded car therein lying above the line of contact between said cage and the supporting surface, and the center of mass of the cage with an empty car lying substantially in the axis of the cage.

5. In a car dump, a substantially cylindrical cage adapted to contain a car to be dumped, said cage supported on a slanting surface and adapted to roll downward on said surface to dump the car, and adapted to roll upward on said surface after the dumping operation to restore the empty car to its normal upright position, the relative positions of the center of mass of the cage with an empty car and the line of contact between the cage and the supporting surface remaining the same during the entire upward rolling of the cage with the empty car.

6. In a car dump, a cage adapted to contain a car to be dumped, said cage adapted to overturn to dump the car, and turn back to restore the empty car to its normal upright position, the center of gravity of the cage with a loaded car being at all times above the axis of rotation of the cage, and the relative positions of the center of gravity of the cage with an empty car and the axis of rotation of the cage remaining the same at all times.

7. In a car dump, a cage adapted to contain a car to be dumped, said cage adapted to overturn to dump the car and turn back to restore the empty car to its normal upright position, the relative positions of the center of gravity of the cage with an empty car and the axis of rotation of the cage remaining the same at all times.

In witness whereof we have hereunto subscribed our names this 20 day of August, 1919.

GEORGE N. SIMPSON.
ARTHUR M. SIMPSON.